(12) United States Patent
Choy

(10) Patent No.: US 10,328,695 B2
(45) Date of Patent: Jun. 25, 2019

(54) FLUID MANIFOLD

(71) Applicant: HEWLETT-PACKARD DEVELOPMENT COMPANY, L.P., Houston, TX (US)

(72) Inventor: Silam J. Choy, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 15/747,419

(22) PCT Filed: Oct. 12, 2015

(86) PCT No.: PCT/US2015/055147
§ 371 (c)(1),
(2) Date: Jan. 24, 2018

(87) PCT Pub. No.: WO2017/065739
PCT Pub. Date: Apr. 20, 2017

(65) Prior Publication Data
US 2018/0215152 A1    Aug. 2, 2018

(51) Int. Cl.
*B41J 2/14* (2006.01)
*B41J 2/155* (2006.01)
*B33Y 30/00* (2015.01)

(52) U.S. Cl.
CPC .......... *B41J 2/14145* (2013.01); *B41J 2/155* (2013.01); *B33Y 30/00* (2014.12); *B41J 2202/11* (2013.01)

(58) Field of Classification Search
CPC ...... B41J 2/155; B41J 2/14145; B41J 2/1637; B41J 2202/11; B41J 2202/21; B33Y 30/00
See application file for complete search history.

(56) References Cited

U.S. PATENT DOCUMENTS

| | | | |
|---|---|---|---|
| 6,322,206 B1* | 11/2001 | Boyd | B41J 2/14024 347/85 |
| 6,736,488 B1* | 5/2004 | Lassar | B41J 2/14072 347/49 |
| 6,952,873 B2 | 10/2005 | Usui et al. | |
| 7,836,599 B2 | 11/2010 | Taira | |
| 8,075,093 B2 | 12/2011 | Silverbrook et al. | |

(Continued)

FOREIGN PATENT DOCUMENTS

| | | |
|---|---|---|
| JP | 8011321 | 1/1996 |
| WO | WO-2014153305 | 9/2014 |

OTHER PUBLICATIONS

Yu et al; "High-Aspect-Ratio Metal Microchannel Plates for Microelectronic Cooling Applications"; Dec. 15, 2009; http://iopscience.iop.org/article/10.1088/0960-1317/20/2/025004/meta;jsessionid=55089B0CB875D0858DAB1BA77D770EBF.c1.

*Primary Examiner* — Anh T Vo
(74) *Attorney, Agent, or Firm* — HP Inc. Patent Department

(57) ABSTRACT

A fluid manifold may include a number of blades and a number of end pieces securing the blades in place wherein the fluid manifold interfaces between a printhead die and a number of fluid source slots. A method of manufacturing a fluid manifold may include arranging a number of metal blades to form a relatively larger pitch between blades on a bottom side of the arranged blades than on a top side the arranged blades and mounting the arranged blades to a mounting structure formed to receive each blade as arranged.

20 Claims, 15 Drawing Sheets

(56) References Cited

U.S. PATENT DOCUMENTS

| | | |
|---|---|---|
| 9,446,587 B2 * | 9/2016 | Chen .................... B41J 2/14072 |
| 10,029,467 B2 * | 7/2018 | Choy ......................... B41J 2/14 |
| 2006/0001704 A1 | 1/2006 | Anderson et al. |
| 2013/0027467 A1 | 1/2013 | Arthur et al. |
| 2013/0050347 A1 | 2/2013 | Rivas et al. |
| 2013/0063523 A1 | 3/2013 | Otaka et al. |
| 2014/0013600 A1 | 1/2014 | Sakuma et al. |

* cited by examiner

FLUID MANIFOLD

BACKGROUND

Printhead dies comprise a number of columns of nozzles that each ejects, in one example, a different color of fluid. Each of these columns are fed fluid with an individualized fluid feed slot. Because of the cost of the silicon used to manufacture the printhead dies, the distance between the fluid feed slots or the pitch and consequently the individual columns may be reduced. As the pitch decreases, however, the ability to provide fluid through the fluid feed slots is reduced.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
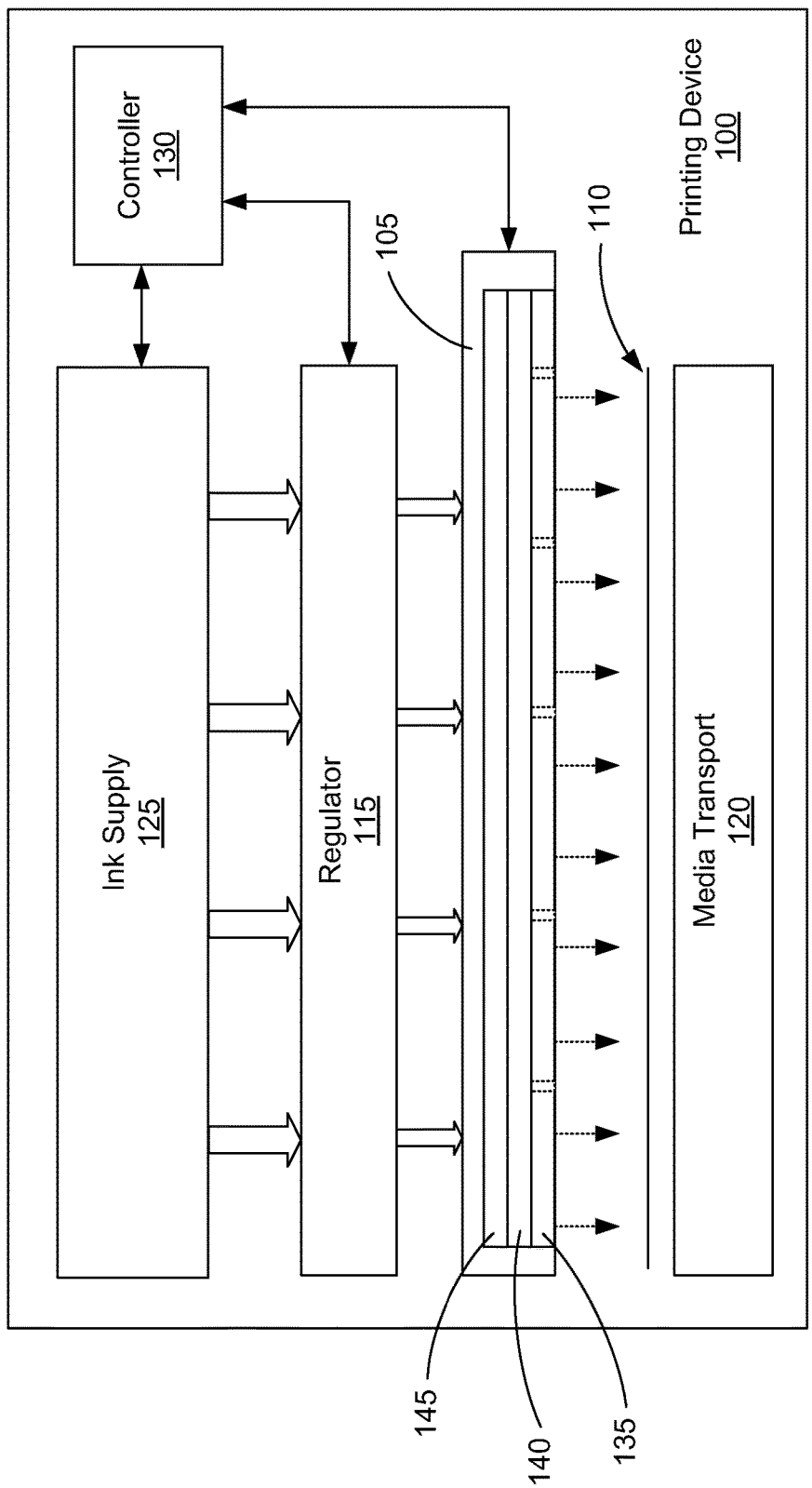
FIG. 1 is a block diagram of a printing device including a number of fluid manifolds according to one example of the principles described herein

As described above, the cost of the silicon used to manufacture the printhead dies has led some to decrease the distance between the fluid feed slots or the pitch. A reduction in the pitch between the fluid feed slots allows for the reduction in the size of the printhead dies. Feed slots with larger pitch do not provide for an interface with printhead dies of reduced sizes. Additionally, the larger pitch fluid feeds slots would not provide the fluid flow characteristics used to have fluid flow from an fluid reservoir to the individual nozzles without some form of pressurization.

The present specification, therefore describes a fluid manifold including a number of blades and a mounting structure securing the blades in place wherein the fluid manifold interfaces between a printhead die and a number of fluid source slots.

The present specification further describes a method of manufacturing a fluid manifold including arranging a number of metal blades to form a relatively larger pitch between blades on a bottom side of the arranged blades than on a top side the arranged blades and coupling the arranged blades to a mounting structure formed to receive each end of each blade as arranged.

The present specification also describes a media wide array including a number of printhead dies, a number of fluid feed slots, and a number of fluid feed manifolds interposed between each of the printhead dies and fluid feed slots, each manifold comprising blades forming fluid channels from the fluid feed slots to the printhead dies.

As used in the present specification and in the appended claims, the terms "printhead" and "printhead die" are meant to be understood broadly as a part of a printer or other type dispenser that dispenses ejection fluid from a number of openings or nozzles.

Additionally, in the present specification and in the appended claims a "printhead die" is meant to be understood as an ejection fluid ejection device that include a number of nozzles defined in a substrate or an overmolded assembly of individual substrates that include a number of nozzles defined therein. The terms "printhead" and "printhead die" are not meant to limit the type of ejection fluid ejected therefrom but instead is meant to include fluid as well as other fluids during, for example, a printing process. A printing process may include two-dimensional and three dimensional printing processes. Additionally a "printhead" or "printhead dies" may be used for other uses other than printing, such as for example digital titration, bio-printing or any other high precision digital dispense process.

Even further, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

FIG. 1 is a block diagram of a printing device (100) including a number of fluid manifolds (140) according to one example of the principles described herein. The printing device (100) may include a print bar (105) that, in one example, spans the width of a print media (110). The printing device (100) may further include a number of flow regulators (115) associated with the print bar (105), a media transport mechanism (120), an fluid or other ejection fluid supply source (125), and a controller (130). The controller (130) may represent the programming, processor(s), associated data storage device(s), and the electronic circuitry and components used to control the operative elements of a printing device (100). The print bar (105) may include an arrangement of printhead dies (135) for dispensing printing fluid onto a sheet or continuous web of paper or other print media (110). The print bar (105) in FIG. 1 includes a plurality of printhead dies (135) spanning print media (110). However, different print bars (105) are contemplated in the present specification that may include more or less printhead dies (135) and may be fixed to a media wide array bar as depicted in FIG. 1 or on a movable print cartridge. In one example, the printhead dies (135) may be thermal fluidjet printhead dies (135) that include a number of firing chambers and resistive elements to heat an ejection fluid and eject the fluid out of a number of nozzles defined in the printhead dies (135).

While thermal fluidjet (TIJ) devices are described throughout the examples herein, any type of digital, high precision liquid dispensing system may utilize these examples. For example, the printhead may include any two-dimensional (2D) printing elements or devices, any three-dimensional (3D) printing elements or devices, digital titration elements or devices, piezoelectric printing elements or devices, other types of digital, high precision liquid dispensing system, or combinations thereof. These various types of liquid dispensing systems may dispense a myriad of types of liquids and ejection fluids including, for example, inks, 3D printing agents, pharmaceuticals, lab fluids, and bio-fluids among other dispensable liquids. The 3D printing agents may include, for example, polymers, metals, adhesives, 3D fluids, among others. The types of ejection fluid may include different colors, different pigments, different agents, among others.

The print bar (105), along with the number of printhead dies (135), may further include a fanout manifold (145) including a number of ejection fluid feed slots. The print bar (105 may also include a number of fluid manifolds (140) (or "chiclets") used to route ejection fluid, such as fluid, from the fanout manifold (145) to the printhead dies (135). In one example, the number of fluid manifolds (140) may equal the number of printhead dies (135) on the print bar (105). In another example, the number of fluid manifolds (140) may be less than the number of printhead dies (135) with a single fluid manifold (140) routing ejection fluid to a plurality of printhead dies (135). In another example, a single fluid manifold (140) may span an entire length of a media wide print bar (105) with a number of printhead dies (135) spanning the entire length of the print bar (105). In this example, the number of printhead dies (135) may be overmolded in, for example, an epoxy mold compound and the distance between columns of nozzles may range from 600 µm to multiple millimeters. Here, the fluid manifold (140) may be reversed in that the pitch between the blades may be larger at the top and at the bottom.

Figure 2:
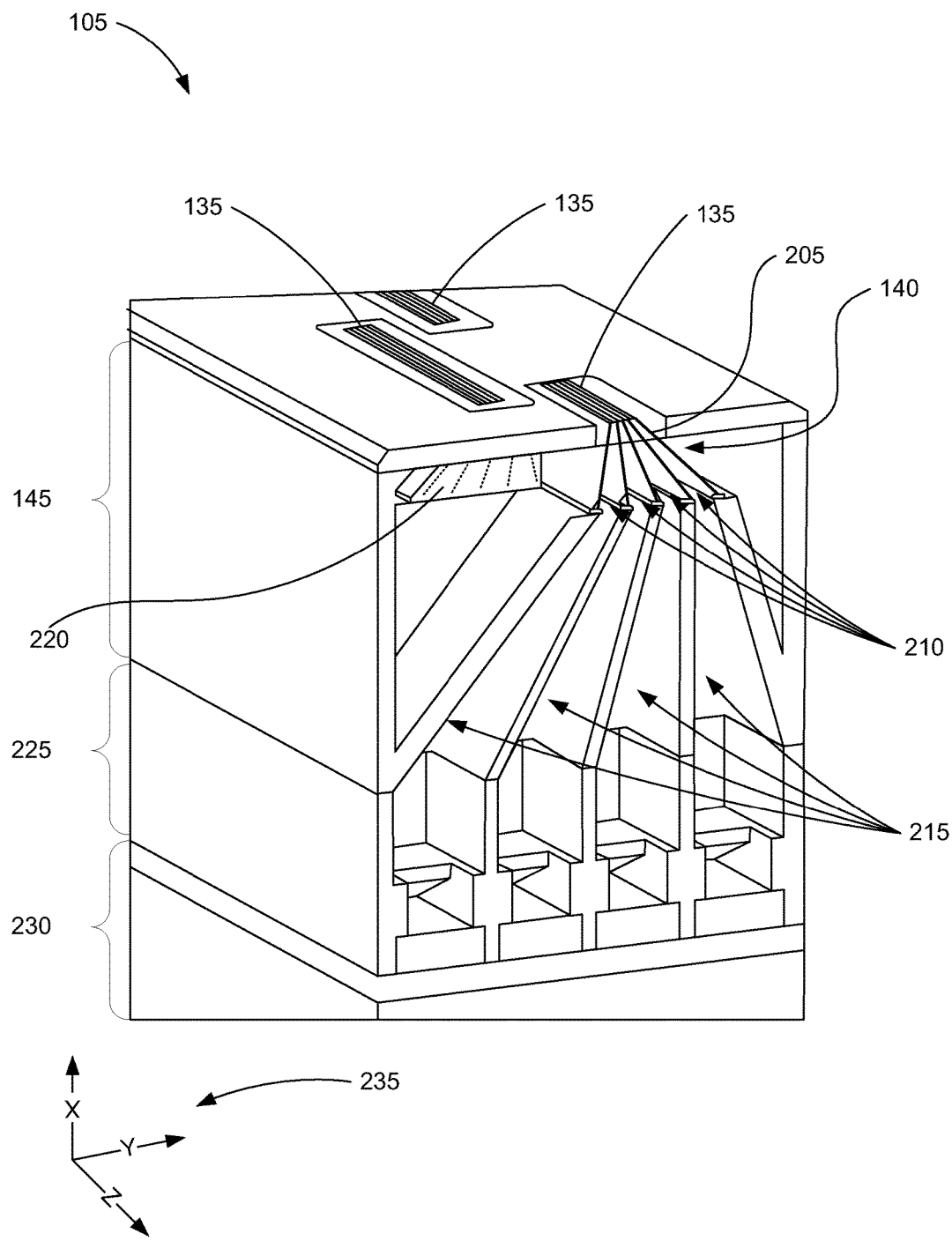
FIG. 2 is a cross sectional perspective view of the print bar of FIG. 1 according to one example of the principles described herein.

FIG. 2 is a cross sectional perspective view of the print bar (105) of FIG. 1 according to one example of the principles described herein. The print bar (105) in FIG. 2 has been inverted as compared to the print bar (105) shown in FIG. 1 with the printhead dies (135) on the top side of the print bar (105). At this perspective view shown in FIG. 2, the "top side" of the printhead dies (135) can be seen with individual columns of nozzles each fed by the rest of the elements of the print bar (105) and including an individual source of ejection fluid.

The print bar (105) may include the fluid manifolds (140) as described above in connection with FIG. 1. Each fluid manifold (140) may include a number of metal blades (205) defining a number of manifold feed slots (210). In one example, a number of manifold feed slots (210) defined in each fluid manifold (140) may equal to a number of ejection fluid slots (215) defined in the fanout manifold (145). In this example, each manifold feed slot (210) may be fluidly coupled to a single ejection fluid slot (215) defined within the fanout manifold (145). In this way, a single type of ejection fluid may be provided to the fluid manifold (140) allowing the fluid manifold to further route the ejection fluid to an appropriate column of nozzles or fluid chamber defined in each of the printhead dies (135).

The width of each printhead die (135) may define the width of the top portion of each of the fluid manifolds (140). Because the fluid manifolds (140) interface between the fanout manifold (145) and the printhead dies (135), the top side of each of the blade (205) separates the fluid flowing into each column of nozzles in the printhead dies (135). The columns of nozzles defined in the printhead dies (135) each have a distance between them. That distance is also reflected in the pitch of the blades (205) such that the distance between each blade (205) provides a barrier between each column of nozzles. As mentioned above, the width of printhead dies (135) are being made smaller in order to reduce the amount of silicon used thereby reducing the costs of manufacturing the printhead dies (135). Consequently, the distance between the columns of nozzles has been reduced preventing other types of fluid channels from being able to direct ejection fluid to such small spaces effectively. The fluid manifolds (140) as described in the present specification act as an interface between the top side of the fanout manifold (145) and the bottom side of the printhead dies (135) and in more particularly the fluid channels of the printhead dies (135). In one example, the size of the printhead die (135) having four columns of nozzles may range from 590 µm to 3600 µm wide with each manifold feed slot (210) having a top side pitch of approximately 590 µm to 3600 µm. Other examples exist where the top side width of the manifold feed slots (210) match any nozzle pitch of a printhead die (135).

The pitch of the bottom side of the manifold feed slots (210) may also vary based on the pitch of the ejection fluid slots (215) defined in the fanout manifold (145). The top side of the fanout manifold (145) may interface with the bottom side of the fluid manifold (140) to maintain a fluid path to the printhead dies (135).

Figure 13A:
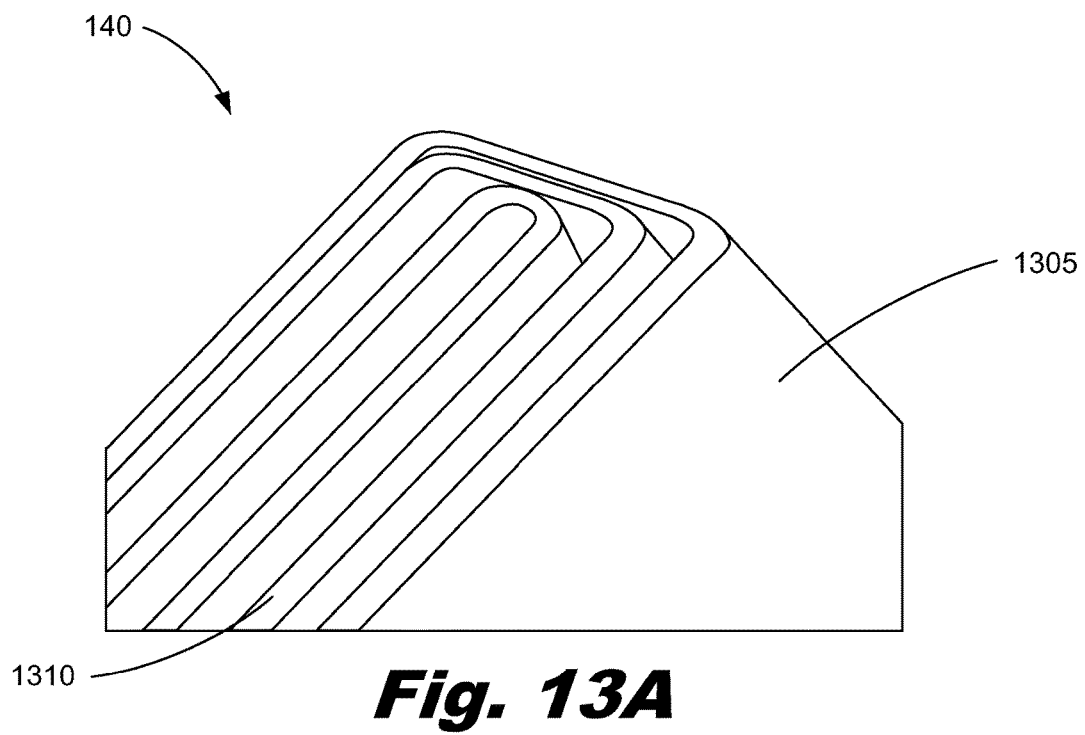
FIGS. 13A and 13B show perspective views of a fluid manifold including a number of formed blades according to one example of the principles described herein.
Figure 13B:
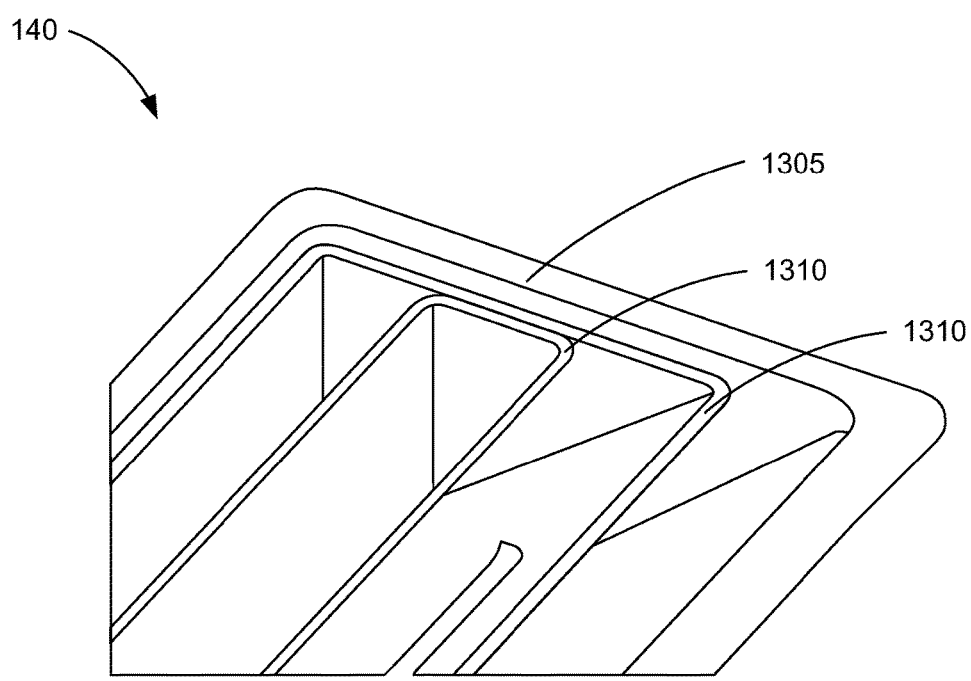

The blades (205) of the fluid manifolds (140) may be held in place by a mounting structure (220): in this example, a number of end pieces. In the examples described herein and in the appended claims, the term "mounting structure" is meant to be understood broadly as any device that maintains an arrangement of blades (205). In one example, the mounting structure (220) includes two end pieces. In another example, the mounting structure (220) is an outer shell (FIGS. 13A and 13B, 1305).

As will be discussed in more detail below, the mounting structure (220) may be made of a resilient material such as plastic or metal and may further include a number of pockets defined along an interior surface thereof into which the side ends of the blades (205) may fit into. In one example, the mounting structure (220) may be made of a thermoset polymer to hermetically seal the blades to the mounting structure (220) such that ejection fluid flowing between the blades (205) does not seep out. A curable adhesive may also be used to seal the joints between the blades (205) and the mounting structure (220).

The mounting structure (220) may be supported by the fanout manifold (145) thereby maintaining the fluid manifolds (140) in position between the fanout manifold (145) and the printhead dies (135). An adhesive may be used to help couple these elements together.

The print bar (105) may further comprise a filter frame (225) coupled to a bottom side of the fanout manifold (145). The filter frame (225) may provide an interface between the fanout manifold (145) and an ejection fluid reservoir (230). The filter frame (225) may include a number of filters to filter out particles and air bubbles prior to the ejection fluid being fed into the fanout manifold (145). During operation, the ejection fluid may be fed, via gravity, from the ejection fluid reservoir (230), through the filter frame (225), through the fanout manifold (145), through the fluid manifolds (140), and to the printhead dies (135). In one example, pressure may be applied to the ejection fluid in the fluid reservoir (230) to push the ejection fluid through the print bar (105) as described.

The fluid manifold (140) may provide for an ejection fluid to reach the silicon slots of a printhead die more uniformly and without a gradient of pressure and inertance that may occur in small fluid channels and that would cause print quality defects. Inertance is a measure of the pressure difference in a fluid required to cause a change in flow-rate with time.

FIG. 2 also includes a coordinate indicator (235) that defines x, y, and z planes. Throughout the specification and in the appended claims, therefore, a "top" surface or "top" edge of an element is meant to be understood as the part of that element along the positive x-axis furthest from the coordinate indicator's (235) origin as shown in FIG. 2. Additionally, throughout the specification and in the appended claims a "bottom" surface or "bottom" edge of an element is meant to be understood as the part of that element along the negative x-axis furthest from the coordinate indicator's (235) origin. This reference frame as well as FIG. 2 will be referenced throughout the specification. This reference frame places the print bar (105) in an inverted position relative to the print bar (105) shown in FIG. 1.

Figure 3:
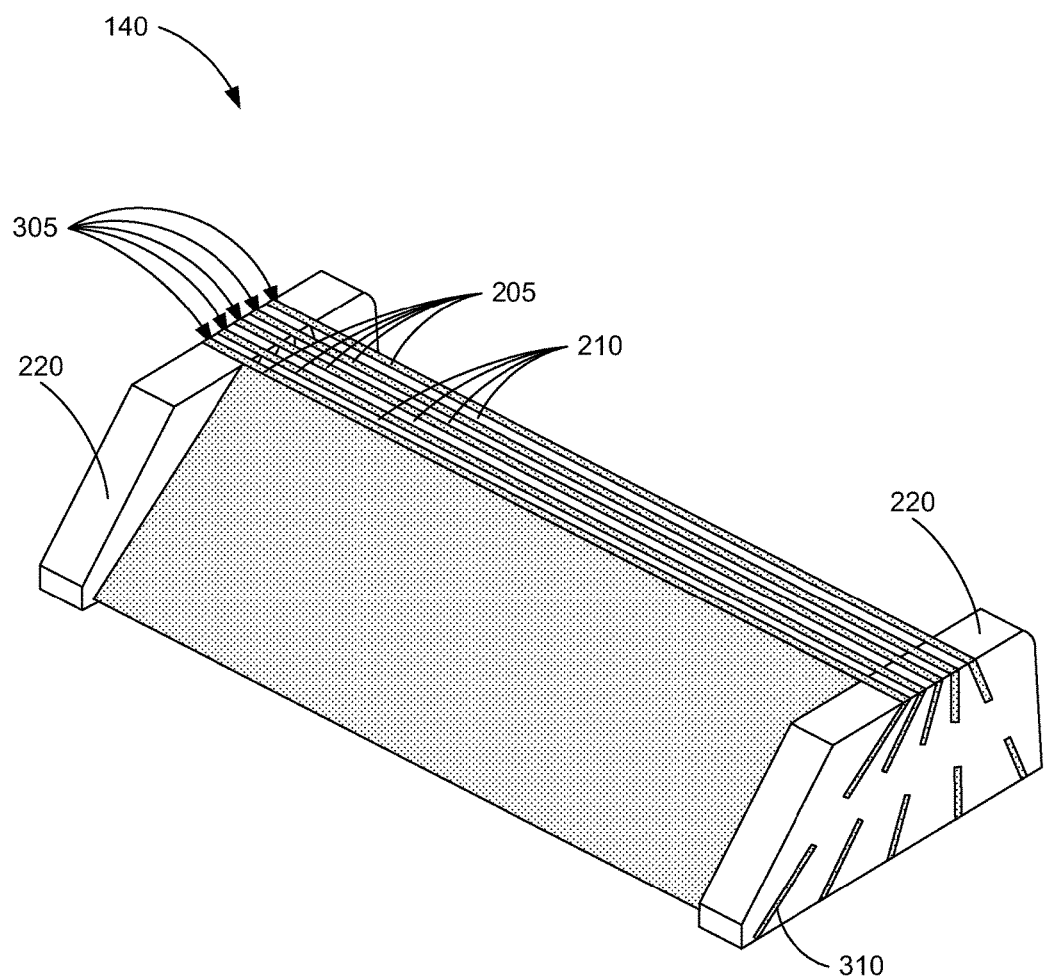
FIG. 3 is a top perspective view of a fluid manifold according to one example of the principles described herein.

FIG. 3 is a top perspective view of a fluid manifold (140) according to one example of the principles described herein. As described above, the fluid manifold (140) may include a number of blades (205) that form manifold feed slots (210). In one example, each of the blades (205) may be 200 µm thick. In one example, the blades (205) may be made of stainless steel. In one example, the blades (205) may be made of a ceramic.

In the example shown in FIG. 3, five blades (205) form four manifold feed slots (210). In this example, the four manifold feed slots (210) may provide to the printhead die (135) four colors of fluid: cyan, magenta, yellow, and black. The present specification, however, contemplates the used of more blades (205) than five in order to create more manifold feed slots (210) than four. In this example, the number of colors may be increased so long as the number of ejection fluid slots (215) defined in the fanout manifold (145) can provide those additional colors.

Two blades (205) out of the five shown in FIG. 3 server both as a wall for a manifold feed slot (210) and an exterior wall of the fluid manifold (140). In one example, an additional piece of material such as a sheet of metal or plastic may be placed over the portions of the fluid manifold (140) that do not interface with either the printhead die (135) or fanout manifold (145) to protect the blades (205) and especially those exterior blades (205). In one example, the mounting structure (220) may further include side pieces that cover the exterior blades (205). In this example, the blades (205) may be inserted into the fluid manifold (140) from the top or bottom of the fluid manifold (140).

Each of the blade (205) may be placed into pockets (305) defined in the mounting structure (220) so that the blades (205) may be retained in a predetermined position. A layer of adhesive may be layered into the pockets (305) in order to maintain the blades (205) in the pockets (305) after assembly.

In the example shown in FIG. 3, a number of end portions (310) of the blades (205) may run through the entire width of the mounting structure (220) and be visible after assembly. In another example, the entire end of each blade (205) may be inserted into the mounting structure (220) and not allowed to pass through the mounting structure (220).

Figure 4A:
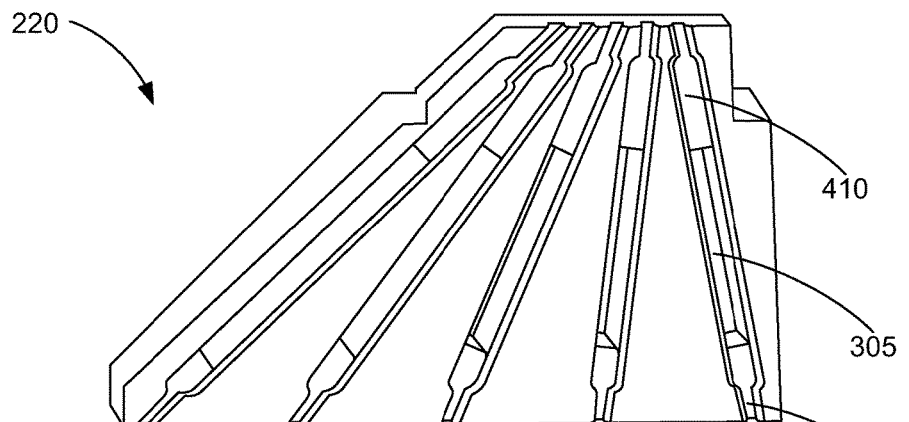
FIG. 4A is a diagram of an interior surface of one of the end pieces of a mounting structure of a fluid manifold according to one example of the principles described herein.
Figure 4B:
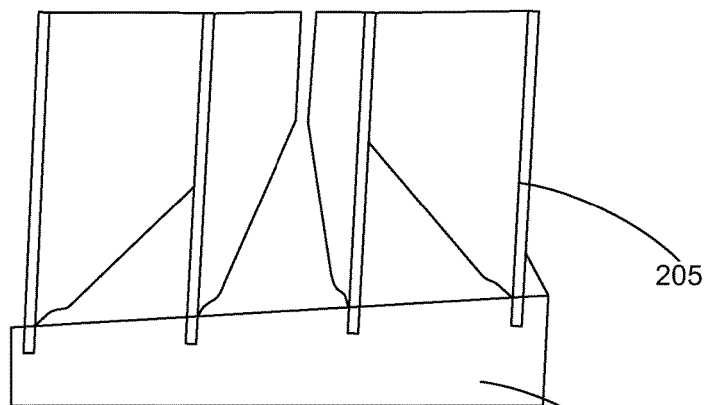
FIG. 4B is a bottom view diagram of the interface between the blades and an end piece according to one example the principles described herein.
Figure 4C:
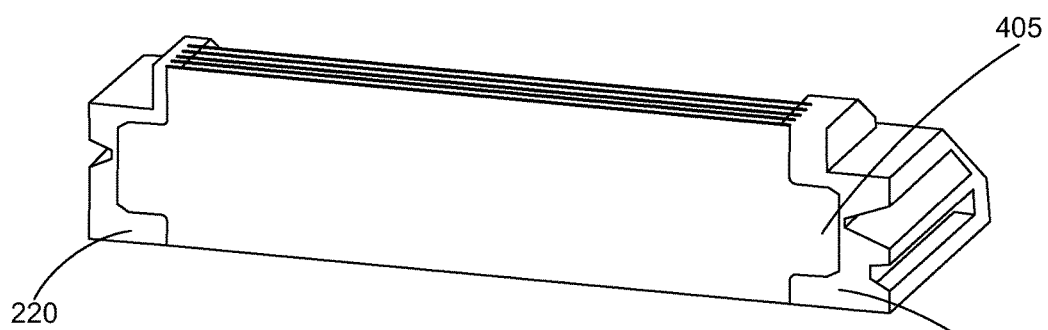
FIG. 4C is a side view of the fluid manifold according to one example of the principles described herein.
Figure 5A:
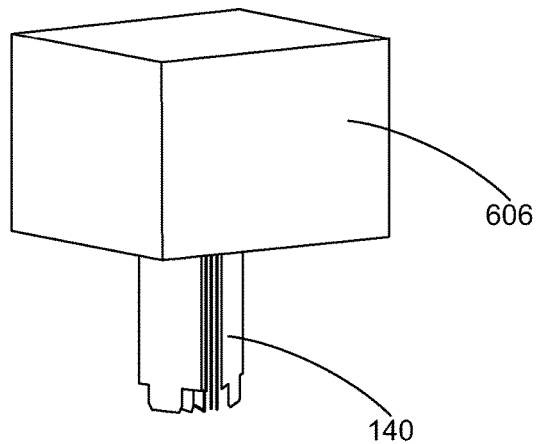
FIG. 5A-5E show a method of manufacturing a fluid manifold according to one example of the principles described herein.
Figure 5C:
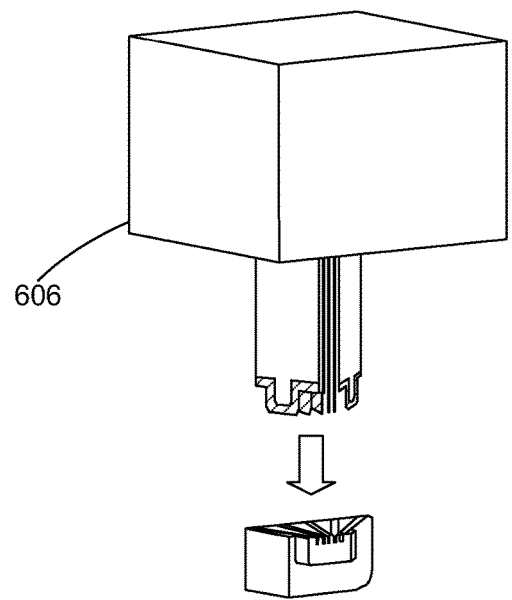
Figure 5B:
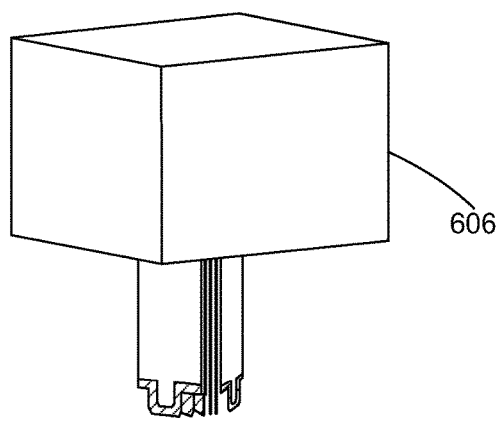
Figure 5D:
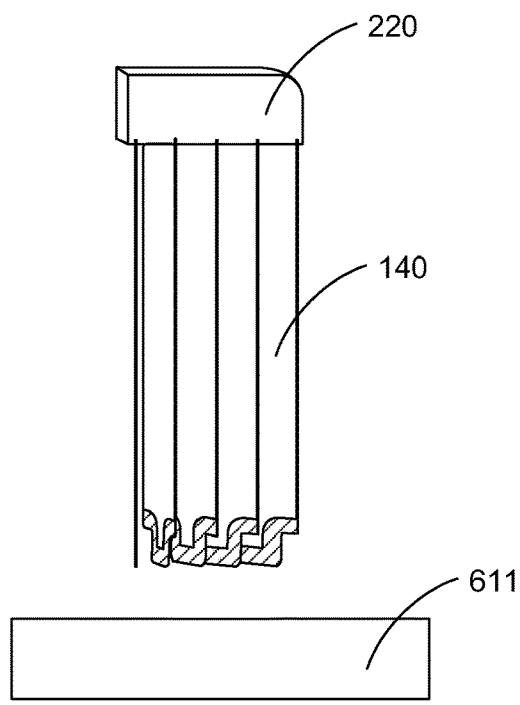
Figure 5E:
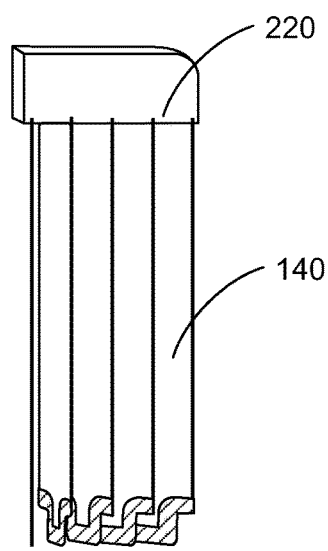
Figure 5E:
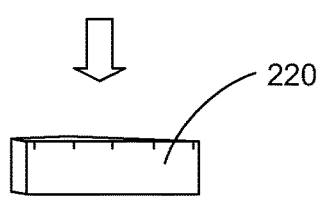

FIG. 4A is a diagram of an interior surface of one of the end pieces of the mounting structure (220) of the fluid manifold according to one example of the principles described herein. FIG. 4B is a bottom view diagram of an interface between the blades (205) and an end piece (220) according to one example the principles described herein. FIG. 4C is a side view of the fluid manifold (140) according to one example of the principles described herein. These figures will be described now in more detail.

FIG. 4A shows in more detail the pockets (305) defined in the interior surface of the mounting structure (220) as described above. In this example, the blades (205) may include a number of tabs (405) that are inserted into the mounting structure (220) in order to fit into the pockets (305). An example of such a tab (405) can be seen in FIG. 4C which shows that the blades (205) can be generally rectangular in shape and may include tabs that extend into or through the mounting structure (220). Each of the pockets (305) may further include pocket channels (410) that laterally align each of the blades (205) after the blades (205) have been pressed into the mounting structure (220).

FIG. 4B shows the underside of a fluid manifold (140) where the blades (205) interface with an end piece (220). In this example, a portion of each blade (205) that is not the tab (405) is pressed into the pocket channels (410) of the end piece (220).

Figure 6:
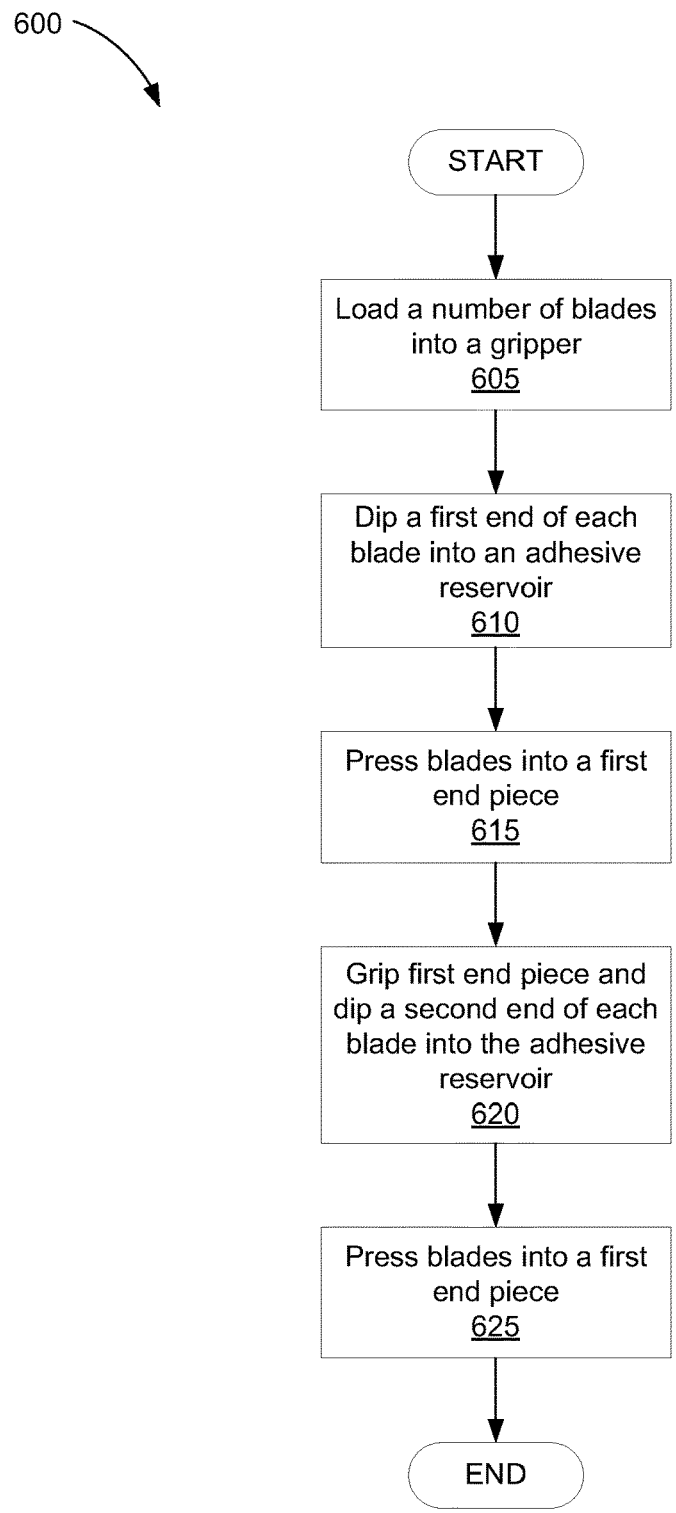
FIG. 6 is a flowchart showing a method of manufacturing a fluid manifold according to one example of the principles described herein.

FIGS. 5A-5E show a method of manufacturing a fluid manifold (140) according to one example of the principles described herein. Additionally, FIG. 6 is a flowchart showing a method (600) of manufacturing a fluid manifold according to one example of the principles described herein. These figures will now be descried together. The method (600) may begin with loading (605) a number of blades (205) into a gripper (606). The gripper (606) may be any type of device that can hold a number of blades (205) in a predetermined configuration for eventual alignment and insertion into the mounting structure (220). Loading (605) the gripper (606) with the blades (205) may include using a part feeder to selectively load the blades (205) into the gripper (606).

The method (600) may continue with using the gripper to dip (610) a first end of each of the blades into an adhesive reservoir (611). The adhesive reservoir (611) may comprise an adhesive that secures the blades (205) into the mounting structure (220) when the blades (205) have been inserted into the pockets (305) and pocket channels (410) of the mounting structure (220).

The method (600) may continue with pressing (615) the blades (205) into a first end piece (220). As described above, the end surfaces of each of the blades (205) may come in contact with the first end piece (220) when the tab (405) is inserted into the pockets (305) and the rest of the ends of the blades (205) are inserted into the pocket channels (410). In one example, the adhesive used may be a light-curable adhesive and the first end piece (220) may be optically translucent to allow the light to cure the adhesive. In one example, the adhesive may be a heat-curable adhesive and the adhesive may be cured by applying an amount of heat after the blades (205) are pressed (615) into the first end piece (220).

The method (600) may continue with gripping (620) the first end piece and dipping a second end of each blade into the adhesive reservoir (611). Similar to above, the adhesive reservoir (611) may comprise an adhesive that secures the blades (205) into the mounting structure (220) when the blades (205) have been inserted into the pockets (305) and pocket channels (410) of the mounting structure (220).

The method (600) may continue with pressing (625) the blades (205) into a second end piece (220). The end surfaces of each of the blades (205) may come in contact with the first end piece (220) when the tab (405) is inserted into the pockets (305) and the rest of the ends of the blades (205) are inserted into the pocket channels (410). In one example, the adhesive used may be a light-curable adhesive and the first end piece (220) may be optically translucent to allow the light to cure the adhesive. In one example, the adhesive may be a heat-curable adhesive and the adhesive may be cured by applying an amount of heat after the blades (205) are pressed (615) into the first end piece (220).

Figure 7:
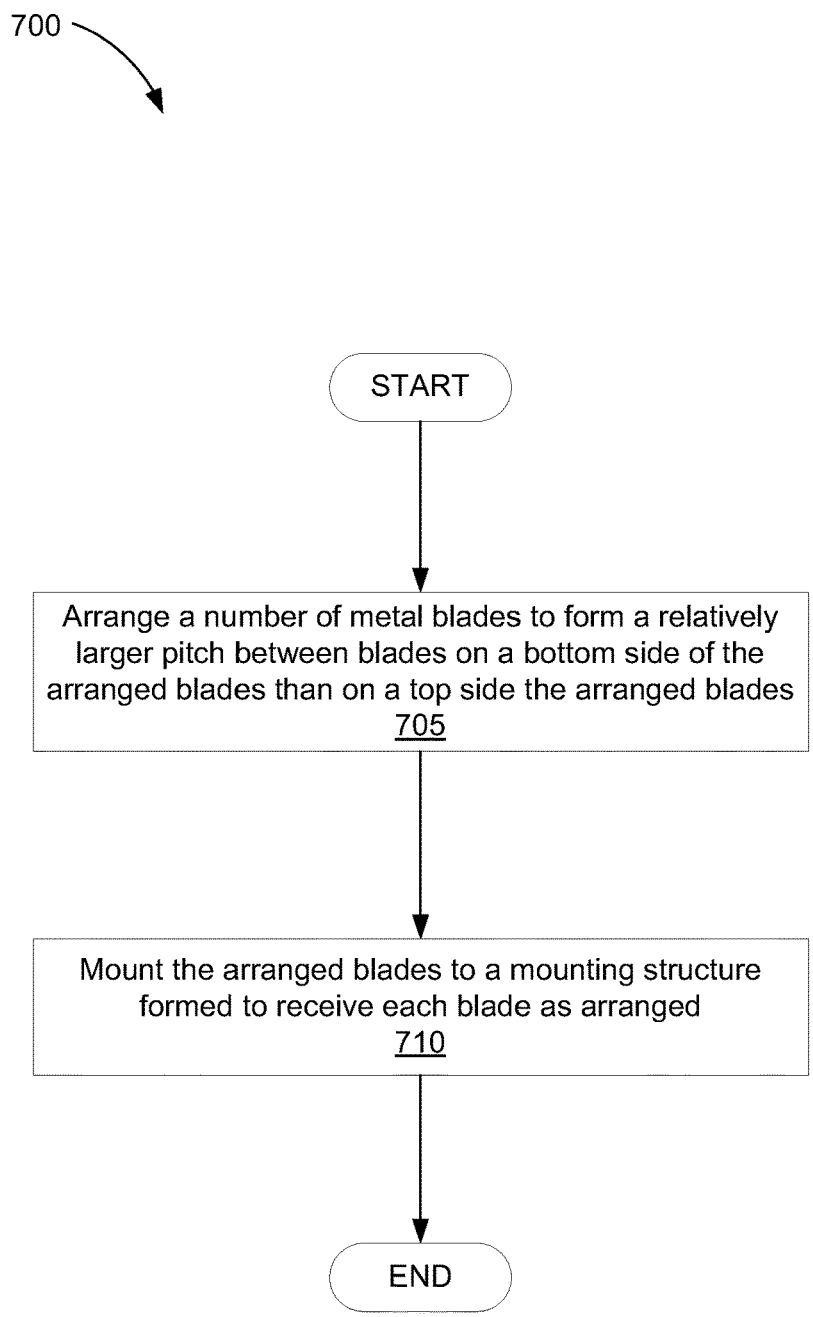
FIG. 7 is a flowchart showing a method of manufacturing a fluid manifold according to one example of the principles described herein.

FIG. 7 is a flowchart showing a method of manufacturing a fluid manifold according to one example of the principles described herein. The method (700) may start with arranging (705) a number of metal blades (205) to form a relatively larger pitch between blades (205) on a bottom side of the arranged blades (205) than on a top side of the arranged blades (205). As described above, the top side width of the manifold feed slots (210) match any distance between nozzle columns of a printhead die (135). This width is measured from one outside blade (205) to the other outside blade (205) at the top.

The method (700) may continue with coupling (710) at each end of the arranged blades (205), an mounting structure (220) formed to receive each end of each blade (205) as arranged. The arrangement may comprise a number of arrangements dependent on a number of factors such as the position of the printhead die (135), the position of the ejection fluid slots (215) of the fanout manifold (145), and the desired flow properties each manifold feed slot (210) formed by the blades (205) creates, among others. In each example, however, the width of the top side of the fluid manifold (140) is shorter than the width of the bottom side of the fluid manifolds (140).

Figure 8A:
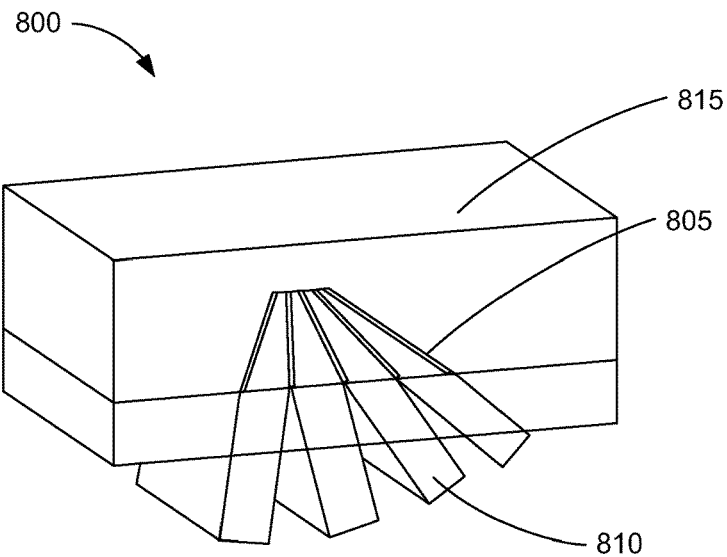
FIGS. 8A-8C show a tool used to manufacture a fluid manifold according to one example of the principles described herein.
Figure 8B:
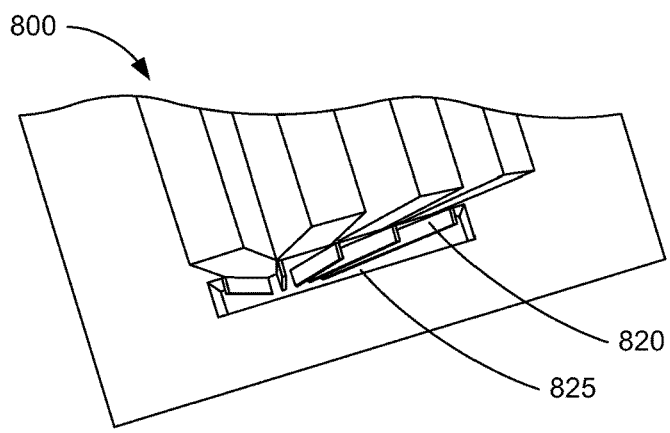
Figure 8C:
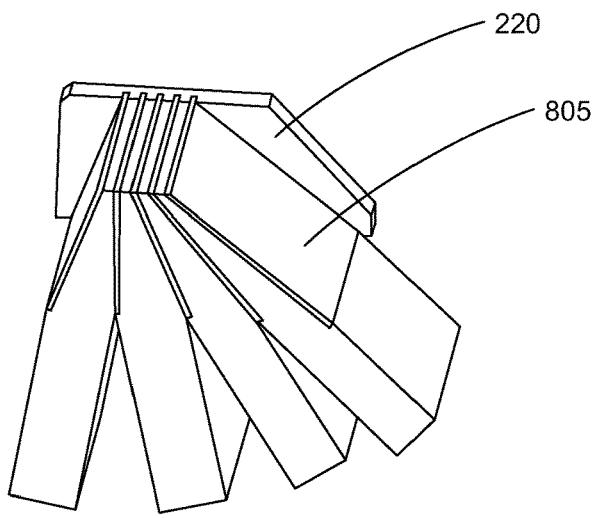
Figure 9:
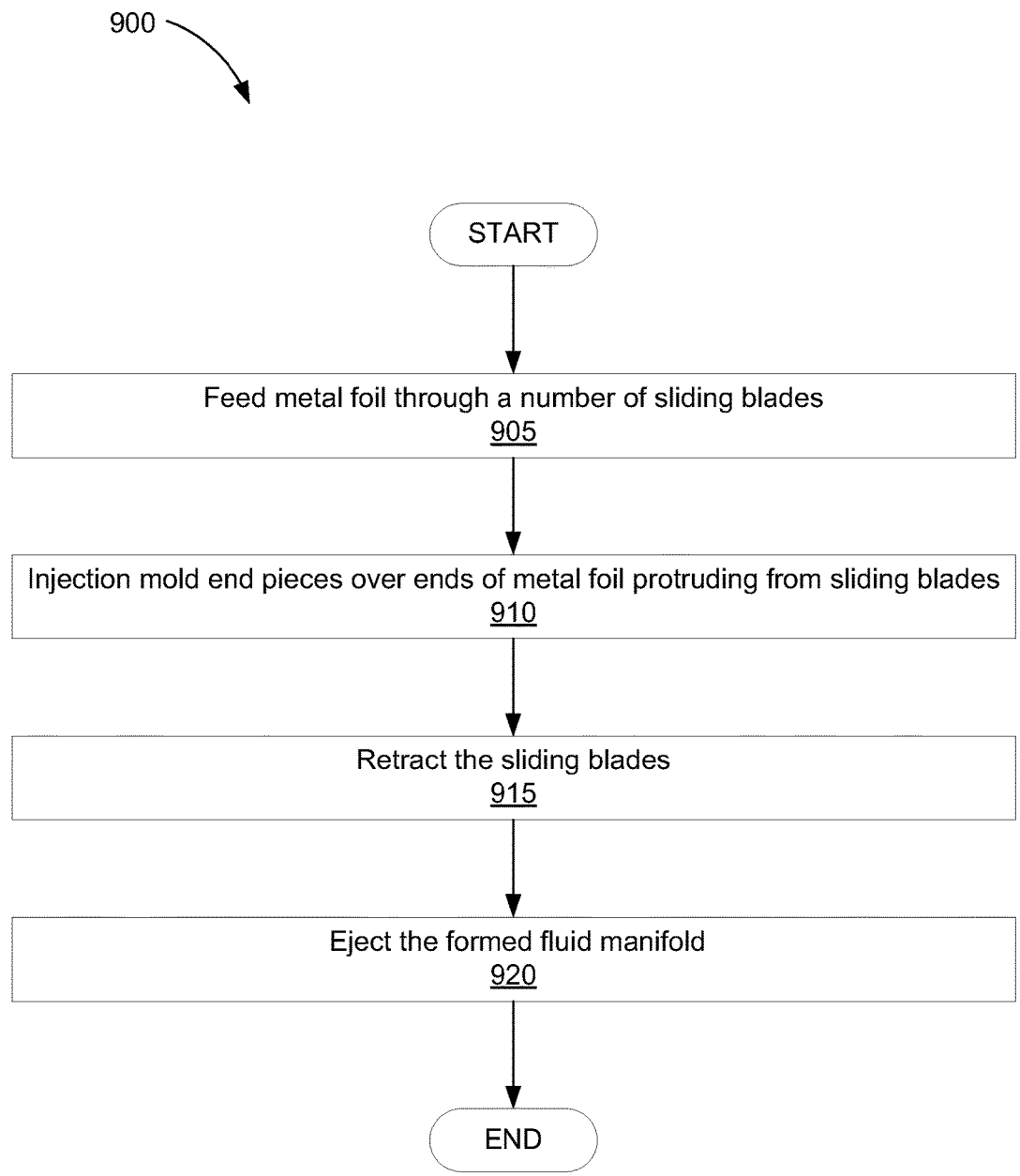
FIG. 9 is a flowchart showing a method of manufacturing a fluid manifold according to one example of the principles described herein.

FIGS. 8A-8C show a tool (800) used to manufacture a fluid manifold (140) according to one example of the principles described herein. FIG. 9 is a flowchart showing a method (900) of manufacturing a fluid manifold according to one example of the principles described herein. The method (900) and tool used to manufacture a fluid manifold (140) will now be explained. The method (900) may begin with feeding (905) metal foil (805) through a number of sliding blades (810). In one example, the metal foil (805) may be single sheet of foil that is continuously fed (905) through the number of sliding blades (810). In this example, the single sheet of foil may be cut up into the blades (205) that form the manifold feed slots (210). In one example, the feeding (905) of the metal foil (805) may include pushing a single blade (205) made of the foil (805) into the number of sliding blades (810) with another blade (205). Whether cut up into individual blades (205) or fed (905) into the number of sliding blades (810) individually, the metal foil (805) is sized to the size of the blades (205) described herein.

The feeding (905) of the metal foil (805) through the number of sliding blades (810) may further be accompanied by adjusting the position of the sliding blades (810) with reference to a void defined in a receiver block (815). When feeding (905) the metal foil (805) through the sliding blades (810), the sliding blades (810) may be retracted out of the cavity defined in the receiver block (815) to lower the friction caused by the metal foil (805) rubbing against the receiver block (815) and sliding blades (810). When enough metal foil (805) has been passed into the sliding blades (810) to form a number of bladed (205), the sliding blades (810) may be pushed into the cavity formed into the receiver block (815) in order to securely lock the metal foil (805) into position.

Each of the sliding blades (810) comprises a wedge that supports a single side of at least one metal foil (805). The angle of the wedges of the sliding blades (810) may determine the final angle of the blades (205) as arranged in the fluid manifold (140). Consequently, the angle of each of the blades (205) may be predetermined by adjusting these angles of these sliding blades (810).

The method (900) may continue with injection molding (910) a mounting structure (220) such as a number of end pieces over ends (820) of the metal foil (805) protruding from sliding blades (810). The injection molding (910) may be accomplished by injecting a thermoset material into an injection cavity (825) defined in the receiver block (815).

The method (900) may continue with retracting (915) the sliding blades (810) and ejecting (920) the formed fluid manifold (140) from the cavity defined in the receiver block (815). Other parts of the tool (800) may contribute to the manufacture of the fluid manifold (140) described herein.

Figure 10:
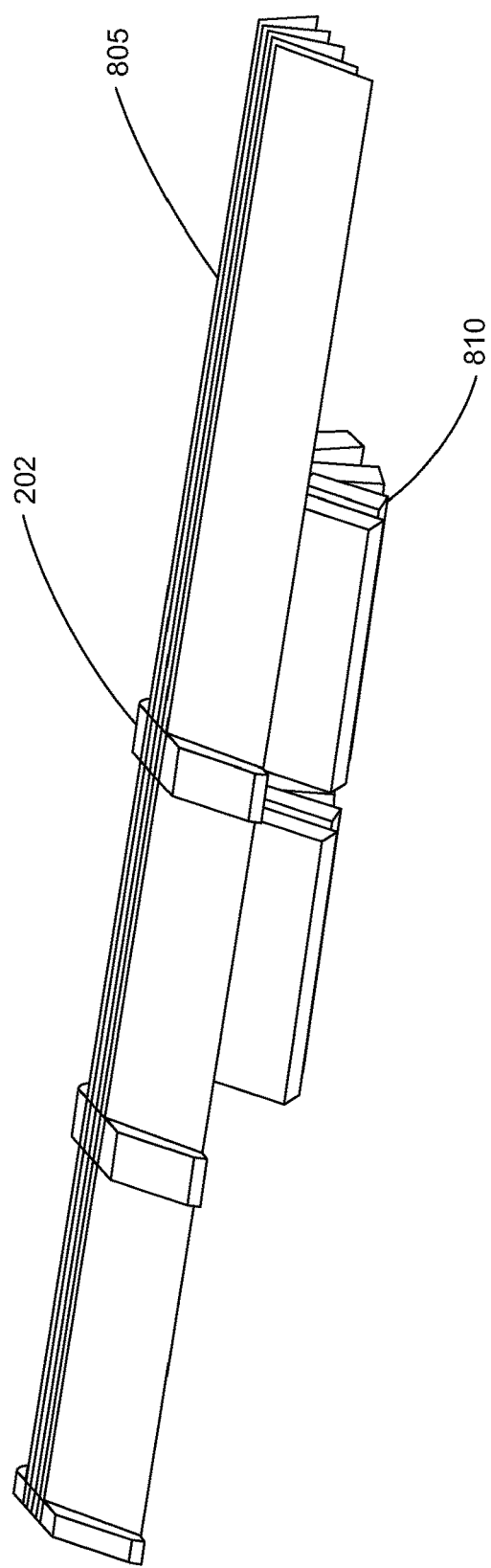
FIG. 10 is a perspective view of the formation of end pieces on the fluid manifold using a number of sliding blades of FIGS. 8A and 8B.

FIG. 10 is a perspective view of the formation of a mounting structure (220) on the fluid manifold (140) using a number of sliding blades (810) of FIGS. 8A and 8B. In the example shown in FIG. 10, a sheet of metal foil (805) is continuously passed through the sliding blades (810) with the injection molding (910) occurring at intervals sufficient to create, in this example, double wide end pieces. The double wide end pieces may then be cut in half to form the fluid manifold (140).

Figure 11A:
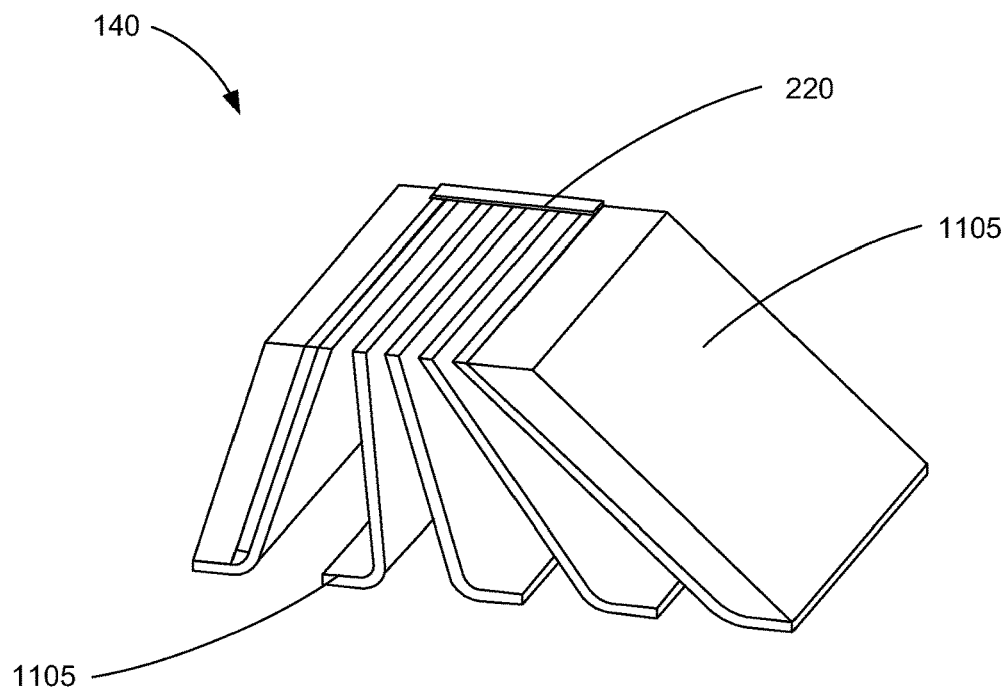
FIGS. 11A and 11B show a perspective view and side view respectively of a fluid manifold including a number of formed blades according to one example of the principles described herein.
Figure 11B:
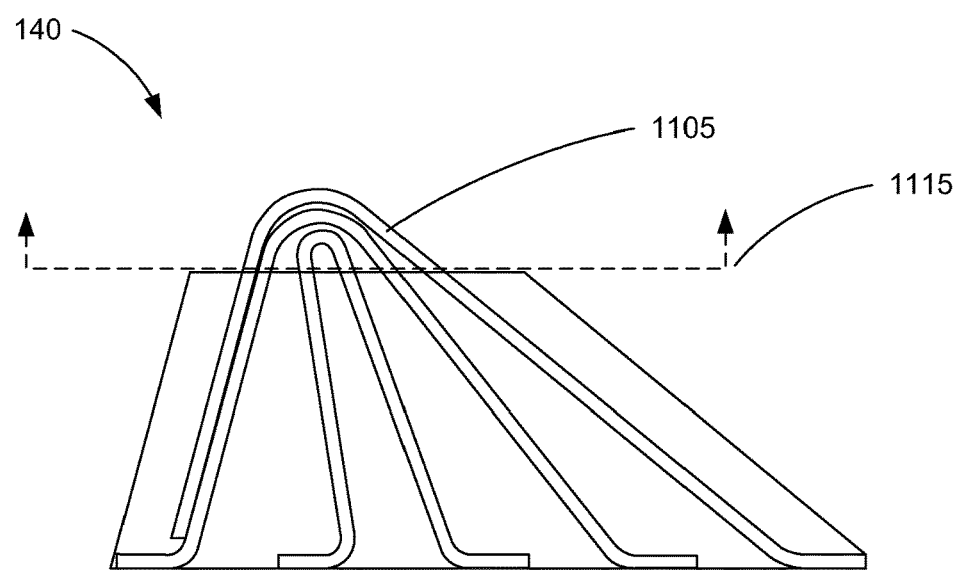

FIGS. 11A and 11B show a perspective view and side view of a fluid manifold (140) including a number of formed blades (205) according to one example of the principles described herein. In this example the fluid manifold (140) may include an outer shell (1105) made of plastic or stainless steel. The blades (205) may be formed of a number of bent and nested sheet metal (1110). As seen in FIG. 11B, the bent and nested sheets of metal (1110) may be bent at a common top portion of the fluid manifold (140). Once the ends of the bent and nested sheets of metal (1110) are coupled within the outer shell (1105) a portion of the bent and nested sheets of metal (1110) may be machined flush with the top of the outer shell (1105) of the fluid manifold (140). This portion of the bent and nested sheets of metal (1110) that may be machined away is indicated by the machine line (1115) in FIG. 11B.

The bent and nested sheet metal (1110) may also include a number of flow regulating folds (1120) at the bottom of each of the bent and nested sheets of metal (1110). The flow regulating folds (1120) may include bent portions of the bent and nested sheets of metal (1110) that protrude into the manifold feed slots (210) defined by the bent and nested sheets of metal (1110). During operation of the fluid manifold (140), the flow regulating folds (1120) may help to regulate the flow of ejection fluid from the fanout manifold (145) to the printhead die (135). The bent portions of the flow regulating folds (1120) may be coupled to the outer shell (1105) by, for example, wicking an adhesive between the bent portions and the outer shell (1105).

Figure 12A:
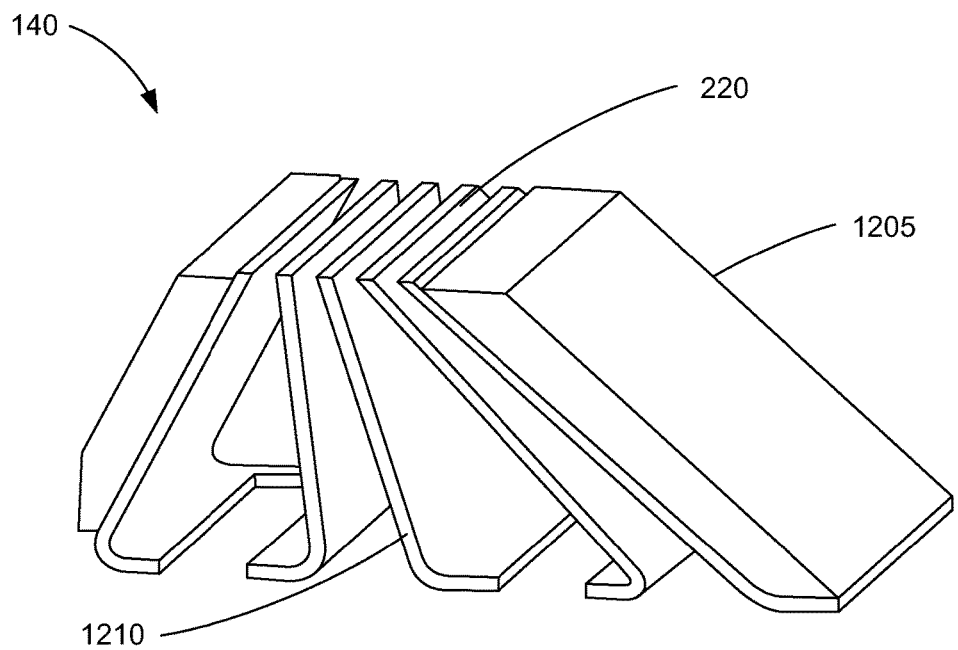
FIGS. 12A and 12B show a perspective view and side view respectively of a fluid manifold including a number of formed blades according to one example of the principles described herein.
Figure 12B:
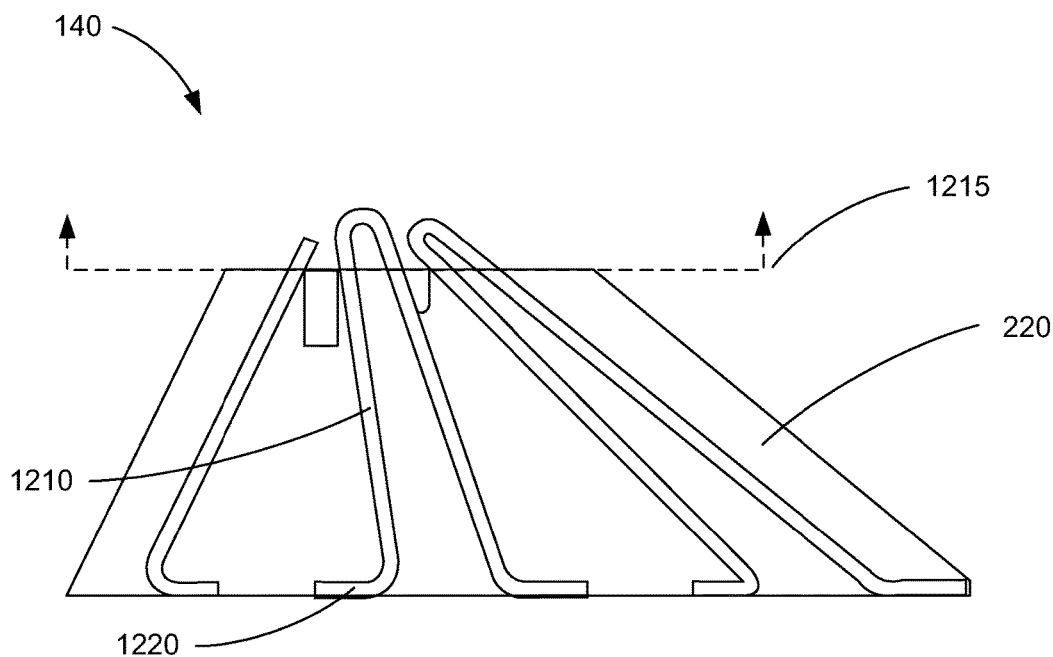

FIGS. 12A and 12B show a perspective view and side view respectively of a fluid manifold (140) including a number of formed blades (205) according to one example of the principles described herein. In this example the fluid manifold (140) may include an outer shell (1205) made of plastic or stainless steel. The blades (205) may be formed of a number of bent sheets of metal (1210). As seen in FIG. 11B, a number of the bent sheets of metal (1110) may be bent at a top portion of the bent sheets of metal (1210). Once the ends of the bent sheets of metal (1210) are coupled within the outer shell (1205) a portion of the bent sheets of metal (1210) may be machined flush with the top of the outer shell (1205) of the fluid manifold (140). This portion of the bent and nested sheets of metal (1210) that may be machined away is indicated by the machine line (1215) in FIG. 12B.

The bent sheets of metal (1210) may also include a number of flow regulating folds (1220) at the bottom of each of the bent sheets of metal (1210). The flow regulating folds (1220) may include bent portions of the bent sheets of metal (1210) that protrude into the manifold feed slots (210) defined by the bent sheets of metal (1210). During operation of the fluid manifold (140), the flow regulating folds (1220) may help to regulate the flow of ejection fluid from the fanout manifold (145) to the printhead die (135). The bent portions of the flow regulating folds (1220) may be coupled to the outer shell (1205) by, for example, wicking an adhesive between the bent portions and the outer shell (1205).

FIGS. 13A and 13B show perspective views of a fluid manifold including a number of formed blades according to one example of the principles described herein. In this example the fluid manifold (140) may include an outer shell (1305) made of plastic or stainless steel. The blades (205) may be formed of a number of metal hoops (1310). As seen in FIG. 13A, a number of metal hoops (1310) may be nested, one within another, within the outer shell (1305). Once the metal hoops (1310) have been inserted into the outer shell (1305), surfaces of the edges of the metal hoops (1310) at two ends may be coupled to each other via, for example, an adhesive.

The metal hoops (1310) may also include a number of flow regulating folds as described in connection with FIGS. 11A-12B at the bottom of each of the metal hoops (1310). The flow regulating folds may help to regulate the flow of ejection fluid from the fanout manifold (145) to the printhead die (135).

The present specification includes examples where sheets of metal are formed to create the blades as described above. In one example, the blades (205) and mounting structure (220) may be manufactured using a subtractive manufacturing process, additive three-dimensional printing process, and combinations thereof. In these examples, the entire fluid manifold (140) may be manufactured as a single piece.

Figure 14A:
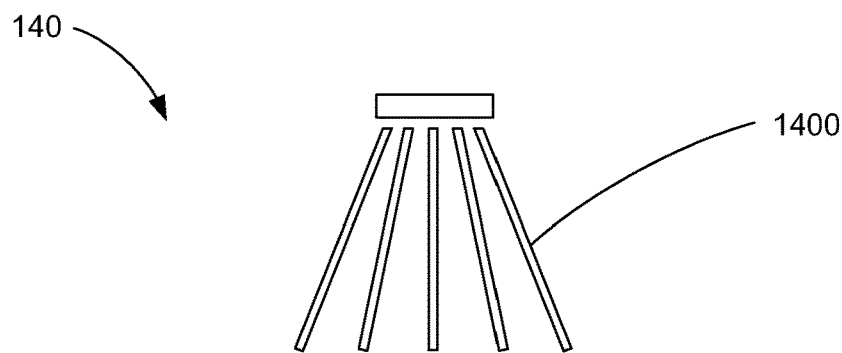
FIGS. 14A and 14B show a side view arrangement of a number of blades of a fluid manifold according to one example of the principles described herein.
Figure 14B:
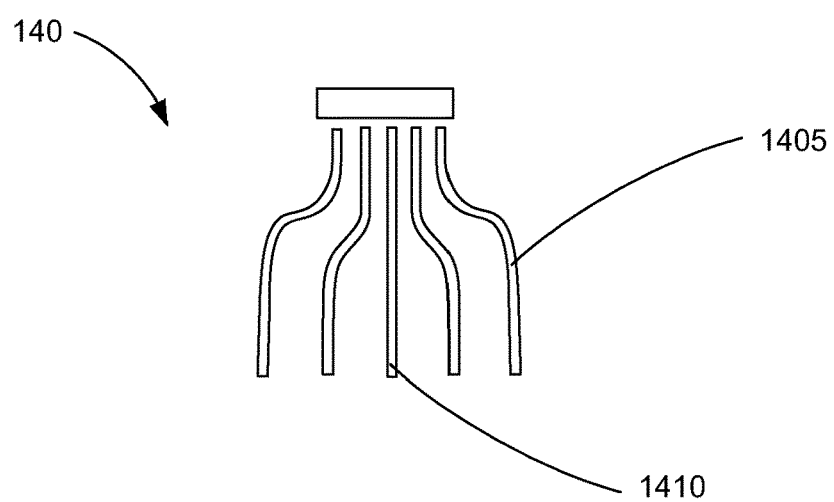

FIGS. 14A and 14B show a side view arrangement of a number of blades (205) of a fluid manifold (140) according to one example of the principles described herein. FIG. 11A shows a number of straight blades (1400) that fan out from a top portion of the fluid manifold (140) to a bottom portion of the fluid manifold (140). The angle of each of the straight blades (1400) may be dependent on a number of factors including the position of the printhead die (135), the position of the ejection fluid slots (215) of the fanout manifold (145), and the desired flow properties each manifold feed slot (210) formed by the blades (205) creates, among others.

FIG. 14B show a number of vertically bent blades (1405) and a straight blade (1410) arranged to interface between a fanout manifold (145) and a printhead die (135). In this example, the vertically bent blades (1405) may include divergent and convergent geometry such that each vertically bent blade (1405) of the fluid manifold (140) may be mostly vertical along the x-axis at the top and bottom of the fluid manifold (140). In this example, the blades are generally parallel at the top and bottom of the fluid manifold (140). Because the vertically bent blades (1405) include a lateral flow direction at an intermediary portion of the blades (1405), different flow properties of the ejection fluid may be realized. In another example, the intermediary portions of the blades (1405) include sharper bends forming, for example, a V-shape. Thus the vertically bent blades (1405) may provide alternative flow properties of the ejection fluid as the ejection is provided from an ejection fluid source, through the vertically bent blades (1405), and to the printhead die (135).

The specification and figures describe a fluid manifold for a thermal fluidjet printhead and media wide array. The fluid manifold as described herein allows a pitch of the printhead to be reduced and thereby reducing printhead cost though use of less silicon. The fluid manifold also allows an ejection fluid to reach the silicon slots of a printhead die more uniformly and without a gradient of pressure and inertance that may occur in small fluid channels and that would cause print quality defects.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluid manifold, comprising:
   a number of blades, the number of blades in the form of a plurality of hoops; and
   a mounting structure securing the blades in place;
   wherein the fluid manifold is to interface between a printhead die and a number of fluid source slots.

2. The fluid manifold of claim 1, wherein the number of blades are made of steel.

3. The fluid manifold of claim 1, wherein an upper portion of the blades interface with a printhead die comprising a number of overmolded printhead dies.

4. The fluid manifold of claim 3, wherein each of the blades comprise beveled edges on each of an upper portion of the blades.

5. The fluid manifold of claim 1, wherein a lower portion of the blades interfaces with a number of fluid feed slots having a pitch larger than a nozzle pitch on the printhead die.

6. The fluid manifold of claim 1, wherein the number of blades form a number of fluid feed slots through which distinct colors of ejection fluid may be passed to the printhead die.

7. A method of manufacturing a fluid manifold, comprising:
arranging a number of metal blades between a number of sliding blades to form a relatively larger pitch between blades on a bottom side of the arranged blades than on a top side the arranged blades; and
mounting the arranged blades to a mounting structure formed to receive each blade as arranged.

8. The method of claim 7, further comprising forming a beveled edge on the top side of each blade to interface with a bottom surface of a printhead die.

9. The method of claim 7, further comprising applying a layer of glue to each of the blades where each of the blades contacts the mounting structure prior to coupling the end piece to each end of the blades.

10. The method of claim 7, wherein the blades are bent along an axis formed from the top side to the bottom side.

11. The method of claim 7, wherein the blades are formed into a flat surface along an axis formed from the top side to the bottom side.

12. The fluid manifold of claim 7, wherein the plurality of hoops are nested within each other.

13. The method of claim 7, wherein the sliding blades are pushed against each other and the blades when the number of metal blades have been inserted between the sliding blades.

14. The method of claim 7, wherein the metal blades are formed of sheet metal and wherein the sheet metal is cut above and below the sliding blades.

15. The method of claim 13, wherein a number of end pieces are formed at ends of the metal blades.

16. A media wide array, comprising:
a number of printhead dies;
a number of fluid feed slots; and
a number of fluid feed manifolds interposed between each of the printhead dies and fluid feed slots, each manifold comprising blades forming fluid channels from the fluid feed slots to the printhead dies; wherein the blades are formed of steel and the pitch of the fluid channels at a top portion of the manifold is between 590 μm to 3600 μm.

17. The media wide array of claim 16, wherein each printhead die comprises a number of silicon substrates, each silicone substrate comprising a column of nozzles with each silicon substrate being overmolded with an epoxy mold compound.

18. The media wide array of claim 16, wherein the pitch of the fluid channels at a top portion of the manifold is 600 μm or less.

19. The media wide array of claim 16, wherein each of the fluid feed manifolds further comprise end pieces to hold and maintain the blades in a predetermined arrangement.

20. The media wide array of claim 16, wherein a thickness of any of the blades is consistent along an entire length of the blades.

* * * * *